United States Patent
He et al.

(10) Patent No.: US 8,472,529 B2
(45) Date of Patent: Jun. 25, 2013

(54) ESTIMATING COMPLEXITY OF VIDEO FRAMES FOR ENCODING

(75) Inventors: Yong He, San Diego, CA (US); Robert S. Nemiroff, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 1102 days.

(21) Appl. No.: 11/959,198

(22) Filed: Dec. 18, 2007

(65) Prior Publication Data

US 2009/0074080 A1  Mar. 19, 2009

Related U.S. Application Data

(60) Provisional application No. 60/972,327, filed on Sep. 14, 2007.

(51) Int. Cl.
*H04N 7/12* (2006.01)
(52) U.S. Cl.
USPC .................................................... 375/240.26
(58) Field of Classification Search
USPC .................................................... 375/240.26
See application file for complete search history.

(56) References Cited

U.S. PATENT DOCUMENTS

| | | | |
|---|---|---|---|
| 6,731,685 B1 * | 5/2004 | Liu et al. .................. | 375/240.14 |
| 7,564,901 B2 | 7/2009 | Wang et al. | |
| 8,325,802 B2 * | 12/2012 | Kondo et al. ............. | 375/240.03 |
| 2002/0064228 A1 * | 5/2002 | Sethuraman et al. ..... | 375/240.12 |
| 2004/0008898 A1 * | 1/2004 | Song et al. ..................... | 382/250 |
| 2004/0179596 A1 * | 9/2004 | Song et al. ............... | 375/240.03 |
| 2006/0093032 A1 * | 5/2006 | Shindo ..................... | 375/240.03 |
| 2007/0280349 A1 * | 12/2007 | Prieto et al. .............. | 375/240.03 |
| 2008/0084928 A1 * | 4/2008 | Wang et al. .............. | 375/240.03 |

* cited by examiner

*Primary Examiner* — Mark Rinehart
*Assistant Examiner* — Christopher R Crompton
(74) *Attorney, Agent, or Firm* — Lori Anne D. Swanson

(57) ABSTRACT

Complexity for a video frame after a special event is estimated and used for encoding the frame. The complexity for a key frame of a special event is estimated based on its intra activity and a complexity of a previously encoded key frame in the video stream prior to the special event. The complexity for a dependent frame after a special event is estimated based on a motion estimation cost for the dependent frame and a complexity of a previously encoded dependent frame prior to the special event.

12 Claims, 4 Drawing Sheets

ESTIMATING COMPLEXITY OF VIDEO FRAMES FOR ENCODING

BACKGROUND

Video signals generally include data corresponding to one or more video frames, where each video frame is composed of an array of picture elements (pixels). A typical color video frame at standard resolution can be composed of over several hundred thousand pixels arranged in an array of blocks. Each pixel is typically characterized with a color (or hue) and luminance characteristics. Thus, digital signals representing a sequence of video frames have a large number of bits. However, the available storage space and bandwidth for transmitting such signals is limited. Therefore, compression processes are used to more efficiently transmit or store video data.

One type of compression technique is the MPEG-4 Part 10 compression (referred to herein as MPEG-4). MPEG-4 is the same as the H.264 standard. These standards, which are identical, are maintained by the ITU and MPEG standards organizations and include both field and frame coding.

Prior to compressing a frame, typically the characteristics or content of the frame is determined. Complexity may be used as a measure of the characteristics or content of the picture or frame. For example, a pure black or a pure white frame has low complexity at least because there is little or no difference between pixels in the frame. Complexity is used to estimate the number of bits per frame. A higher complexity means more bits are needed to represent data in the frame. It is standard to budget a number of bits per frame. Then, during coding, the encoder tries to meet that bit budget per frame. If the budget is exceeded, it may cause overflow of a video buffering verifier, which is a model hypothetical decoder buffer used in MPEG-4. Then, the next frame will have to take away bits, which can results in video degradation.

Special events, such as scene changes, may result in consecutive frames having substantially different images. Conventional encoders may base complexity of a frame solely on the complexity of the previous frame. However, if the consecutive frames are substantially different, such as due to a scene change or other special event, then the complexity determination becomes inaccurate. This can lead to video breaks or other video degradation.

BRIEF DESCRIPTION OF THE DRAWINGS

Embodiments are illustrated by way of example and not limited in the following Figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the description of the embodiments.

According to an embodiment, video complexities are estimated for frames of a special event or right after a special event. A special event may include an event in one or more video frames that makes it difficult to estimate video complexities of frames during and/or after the event when the complexities are based on video frames prior to the event. Some examples of special events include a scene change, flash, fade, etc.

Figure 1:
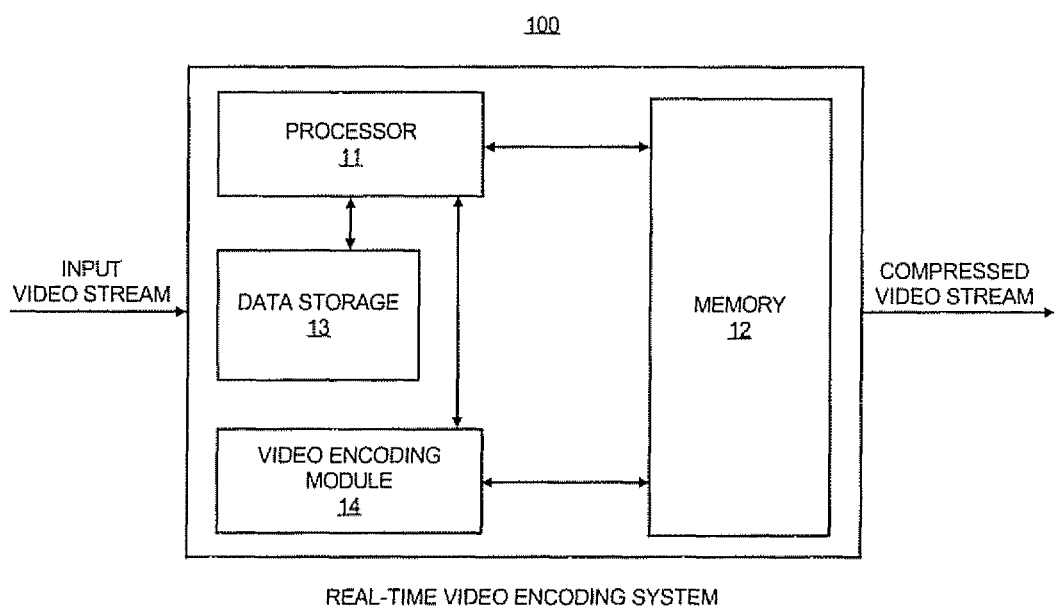
FIG. 1 illustrates a system, according to an embodiment.

FIG. 1 illustrates a video encoding system 100, according to an embodiment. The system 100 is operable to code video in real time. The coding includes compressing video code. For example, the encoding system 100 may comprise an MPEG-4 encoder.

In one embodiment, the video encoding system 100 is implemented on a general-purpose computer or any other hardware equivalent. For example, the system 100 may comprises a processor (CPU) 11, memory 12, e.g., random access memory (RAM) and/or read only memory (ROM), a video encoding module 14, and data storage 13, e.g., a hard disk drive.

It should be understood that the video encoding module 14 may be implemented as one or more physical devices that are coupled to the processor 11 through a communication channel. Alternatively, the video encoding module 14 may be represented by one or more software applications or with a combination of software and hardware, e.g., using application specific integrated circuits (ASIC), where the software is loaded from a storage medium, (e.g., a magnetic or optical drive or diskette) into memory 12 and operated on by the processor 11 of the video encoding module 14. As such, the video encoding module 14 may be stored on a computer readable medium, e.g., RAM, ROM, magnetic derive, optical drive, hard drive, or the like.

Figure 2:
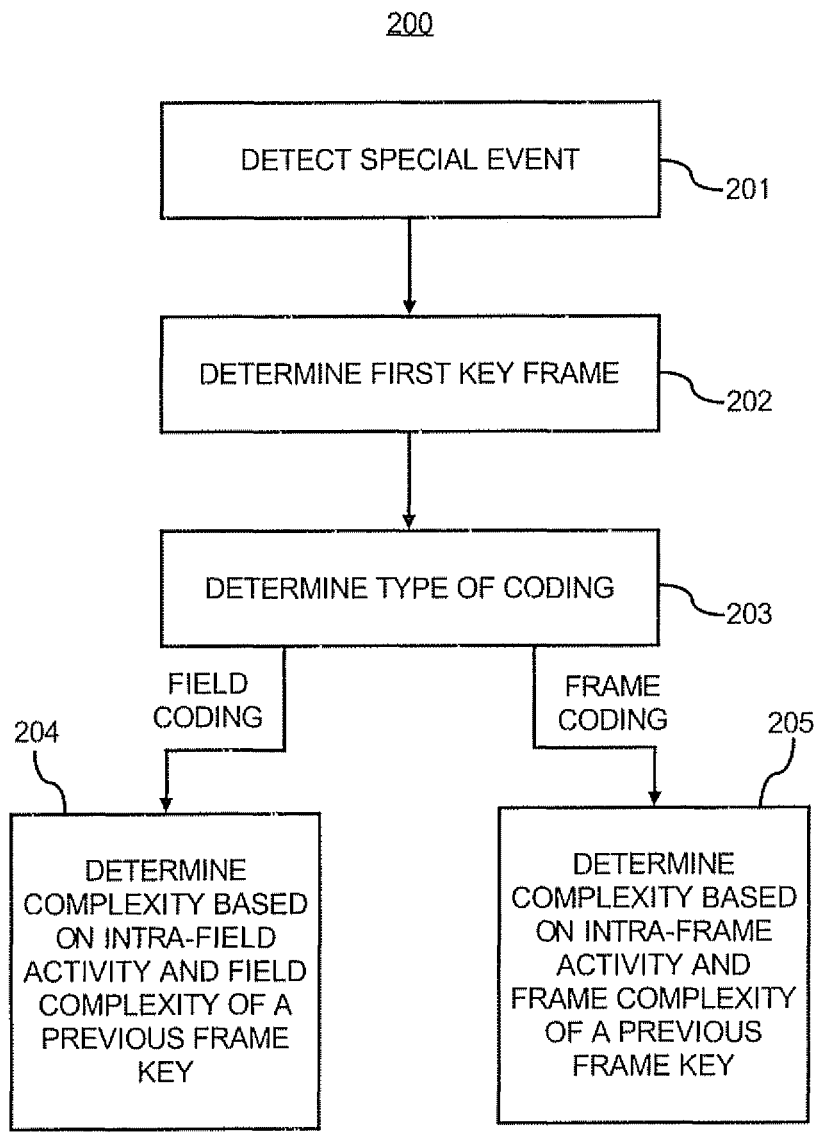
FIG. 2 illustrates a method for estimating complexity of a key frame, according to an embodiment.

FIG. 2 illustrates a flow chart of a method for encoding video, according to an embodiment. The method 200 may be performed by the video encoding system 100 or other encoders. Although the method 200 described a method for encoding, it will be apparent to one of ordinary skill in the art that decoding processes may be used to decode data that is encoded to processes described herein.

At step 201, a special event is detected in a frame. Known methods may be used to detect special events, such as scene changes, fades, flashes, etc. Scene change, fade, and flash detection may be performed using any known technique. For example, a fade may be detected if the average picture brightness is decreasing over a number of frames. Moreover, a flash may be detected when the picture brightness increases rapidly above an upper threshold.

At step 202, a first key frame of the special event is determined. A key frame may be a frame that is coded without reference to another frame. In MPEG, a key frame is an intra picture, also referred to as an I frame. I frames are often used as references for coding other frames, such as predicted pictures (P frames) or bi-predictive pictures (B frames). An I frame may occur during or right after a special event. For example, if a scene change is detected, then the I frame containing the scene change may be identified as the first key frame. For other special events, such as fade-in, fade-out, or flash, the I frame of the special event or just after the special event may be used.

At step 203, the type of coding for the first key frame is determined. For example, MPEG-4 supports picture-adaptive frame-field coding. Each picture can be coded as one frame (frame coding mode) or coded as two individual fields (field coding mode). For frame coding mode, each macroblock pair could be coded as frame or field if macroblock-adaptive frame-field (MBAFF) coding is enabled. If field coding is used, then the complexity for the first key frame, which may be an I frame, is computed based on the intra-field activity and the field complexity of a previous key frame prior to the special event (step 204). Equation 1 may be used to calculate frame complexity for field coding as follows:

$$C_{field\_I} = \frac{Act_{field\_I}}{Act_{prev\_field\_I}} * C_{prev\_field\_I} \qquad \text{Equation 1}$$

If frame coding is used and MBAFF is not active, then the complexity for the first key frame is computed based on the intra-frame activity and the frame complexity of a previous key frame prior to the special event (step 205). Equation 2 may be used to calculate frame complexity for frame coding as follows:

$$C_{frame\_I} = \frac{Act_{frame\_I}}{Act_{prev\_frame\_I}} * C_{prev\_frame\_I} \qquad \text{Equation 2}$$

In Equations 1 and 2, $Act_{field\_I}$ and $Act_{frame\_I}$ are the intra-field activity and intra-frame activity, respectively, of a current I frame. $C_{prev\_field\_I}$ and $C_{prev\_frame\_I}$ are the field and frame complexity, respectively, of the previous coded I frame prior to the special event. The intra-field activity or the intra-frame activity is the variance between pixels within a field or a frame, respectively. The variance between adjacent pixel blocks can be determined using a sum of absolute differences (SAD) calculation. For example, the absolute value of the difference between each pixel in first block and the corresponding pixel in a second block is determined. These differences are summed to create a metric of block similarity. Other metrics may also be used to determine variance. The field and frame complexity of a previous coded I frame can be determined from the previous encoded frame and distortion measurements as is known in the art.

Figure 3:
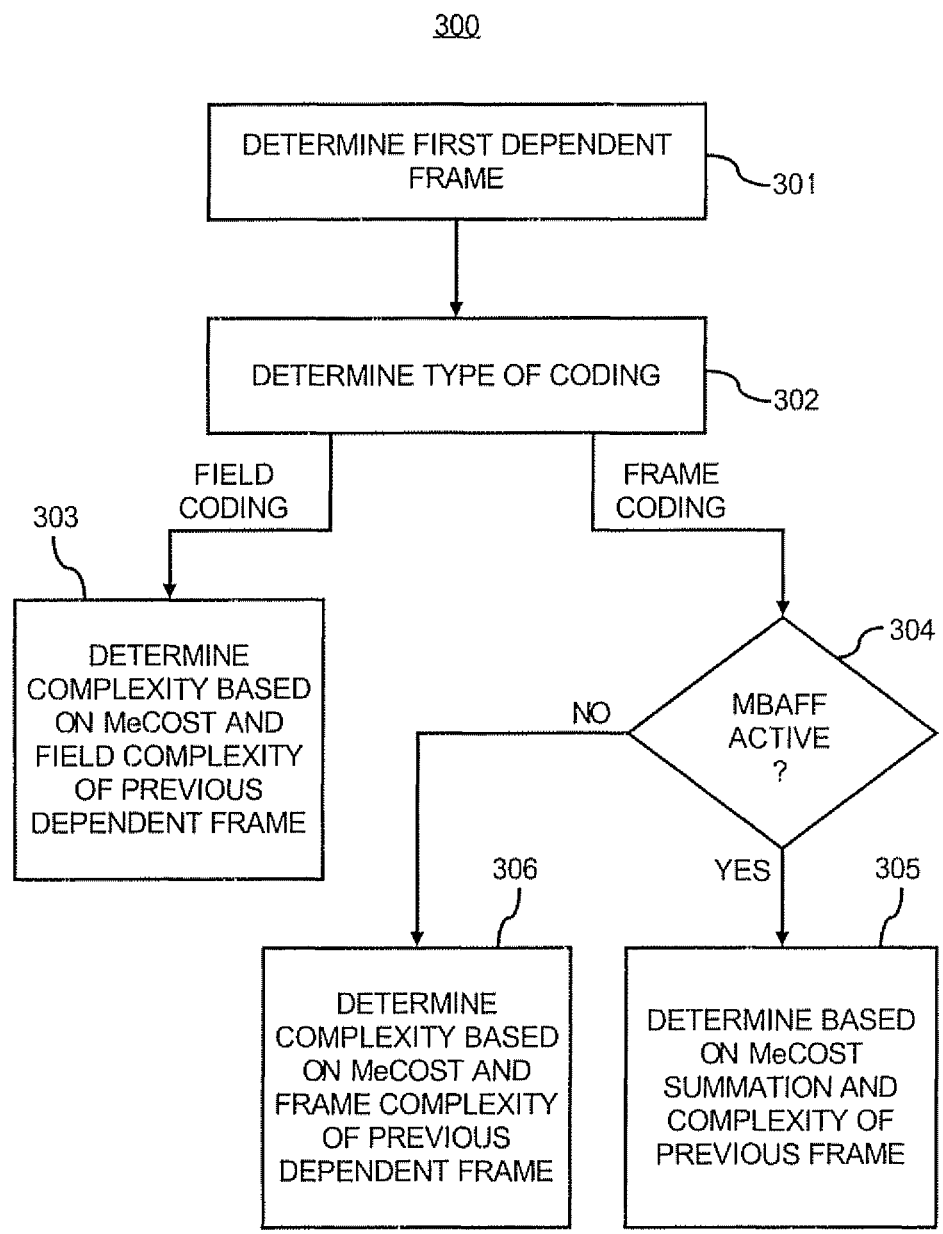
FIG. 3 illustrates a method for estimating complexity of a dependent frame, according to an embodiment.

After a special event, dependent frame complexities are also determined. A dependent frame is a frame that is coded based on a previous frame. Examples of types of dependent frames are P frames and B frames in MPEG. FIG. 3 illustrates a method 300 of determining the complexity of a dependent frame according to an embodiment.

At step 301, the first dependent frame after the first key frame is determined. The special event and the first key frame are identified in steps 201 and 202 of the method 200.

At step 302, the type of coding of the first dependent frame is determined. For example, MPEG-4 allows for field coding, frame coding or both field coding and frame coding of macroblocks in a frame. Frame type and type of coding may be determined from header information for the frame or field.

If field coding is used, then the complexity for the first dependent frame is computed based on the motion estimation cost (MeCost) of the first dependent frame and the complexity of a previous dependent frame prior to the special event at step 303. MeCost, as defined by the JM reference software which is public AVC code used as a benchmark in the industry, uses a cost function to determine the best motion vector. This method includes the sum of absolute differences plus the cost of sending the motion vector. This method forces tighter motion vectors over low complexity areas. MeCost=SAD+ $\lambda$*R*(pmv−cmv) where $\lambda$ is the Lagrange multiplier (related to QP), pmv is the predicted motion vector, and cmv is the current motion vector. R*(pmv−cmv) is the number of bits to code the motion vector. MeCost may be used to scale the complexity of the previous dependent frame, as described below.

Equation 3A may be used to calculate frame complexity for field coding of a P frame as follows:

$$C'_{field\_P} = \frac{MeCost_{field\_P}}{MeCost_{prev\_P}} * C_{prev\_P}; \qquad \text{Equation 3A}$$

Equation 3B may be used to calculate frame complexity for field coding of a B frame as follows:

$$C'_{field\_B} = \frac{MeCost_{field\_B}}{MeCost_{prev\_B}} * C_{prev\_B}; \qquad \text{Equation 3B}$$

$MeCost_{field\_P}$ or $MeCost_{field\_B}$ is the motion estimation cost when every macroblock in the field in the first dependent frame is coded in field mode. $MeCost_{prev\_P}$ or $MeCost_{prev\_B}$ is the motion estimation cost for the previously encoded dependent frame prior to the special event. That corresponding dependent frame is a dependent frame prior to the special event that is in sequence. For example, if the first dependent frame after the special event is a P frame right after an I frame, then the corresponding dependent frame is a P frame right after an I frame prior to the special event. This is further illustrated in the example below.

Also, in equations 3A-B, $C_{prev\_P}$ and $C_{prev\_B}$ are the frame complexities for the corresponding P frame and the corresponding B frame, respectively, prior to the special event. These complexities may be calculated as is known in the art and are the actual complexities of the frames.

If the first dependent frame, which may be a P frame or a B frame, is frame coded rather than field coded, then at step 304, a determination is made as to whether MBAFF is active. If MBAFF is active in frame coding mode, then each macroblock pair in a frame could be field or frame coded. If MBAFF is active, then the complexity of the first dependent frame is determined at step 305 by scaling a complexity of a corresponding dependent frame prior to the special event. Equations 4A-B may be used to determine the complexity of the first dependent frame at step 304 for P and B frames, respectively, as follows:

$$C'_{frame\_P} = \frac{totalMbMeCost_{frame} + totalMbMeCost_{field}}{MeCost_{prev\_P}} * C_{prev\_P}; \qquad \text{Equation 4A}$$

$$C'_{frame\_B} = \frac{totalMbMeCost_{frame} + totalMbMeCost_{field}}{MeCost_{prev\_B}} * C_{prev\_B} \qquad \text{Equation 4B}$$

$totalMbMeCost_{frame}$ is the MeCost of the frame coded macroblocks in the current frame and $totalMbMeCost_{field}$ is the MeCost of the field coded macroblocks in the frame. Thus $totalMbMeCost_{frame} + totalMbMeCost_{field}$ is an MeCost summation of two MeCosts. $MeCost_{prev\_P}$ and $MeCost_{prev\_B}$ are the motion estimation costs of the corresponding dependent frame (for P and B frames respectively) prior to the special event.

If MBAFF is not active as determined at step 304, then the complexity of the first dependent frame is determined at step 306 by scaling a complexity of a corresponding dependent frame prior to the special event. The complexity of the corresponding dependent frame is scaled based on the MeCosts of the current frame and the corresponding dependent frame prior to the special event. Equations 5A-B may be used to determine the complexity of the first dependent frame at step 306 for P and B frames, respectively, as follows:

$$C'_{frame\_P} = \frac{MeCost_{frame\_P}}{MeCost_{prev\_P}} * C_{prev\_P};\quad\text{Equation 5A}$$

$$C'_{frame\_B} = \frac{MeCost_{frame\_B}}{MeCost_{prev\_B}} * C_{prev\_B}\quad\text{Equation 5B}$$

One or more of the steps of the method 300 are repeated until complexity is estimated for each type of frame. For example, the steps are repeated until complexities for the first I frame, P frame and B frame after the special event are determined. Then, any subsequent dependent frames may use the complexity of a previous frame to determine its complexity. For example, the complexity of a second P frame after the special event is determined from the actual complexity of the first P frame after the special event. Actual complexity may be calculated from the first coded P frame and distortion values received from the receiver.

According to another embodiment, the complexity for a first dependent frame, such as a P or a B frame, after a special event is determined from the complexity of the first key frame of the special event, such as an I frame. If the first dependent frame is a P frame in field coding mode, the complexity of the P frame may be computed using Equation 6 as follows:

$$C^*_{field\_P} = \frac{42}{160} * C_{field\_I}\quad\text{Equation 6}$$

In Equation 6, $C_{field\_I}$ is the actual complexity of the first key I frame, and it is scaled by the ratio 42/160. 42 and 160 may be initialization values. Examples of initialization values are described in U.S. patent application Ser. No. 11/539,786, entitled "Method and Apparatus for Providing Rate Control for Panel-Based Real-Time Video Encoder", assigned to Motorola, Inc., which is incorporated by reference in its entirety. Examples of initialization values for frame and field coding include $C_{frame\_I}=160$, $C_{frame\_P}=60$, $C_{frame\_B}=42$, $C_{field\_I}=160$, $C_{field0\_P}=60$, $C_{field1\_P}=42$, and $C_{field\_B}=42$.

If the first dependent frame is a P frame in frame coding mode, the complexity of the P frame may be computed using Equation 7 as follows:

$$C^*_{frame\_P} = \frac{60}{160} * C_{frame\_I};\quad\text{Equation 7}$$

In Equation 7, $C_{frame\_I}$ is the actual complexity of the first key I frame, and it is scaled by the ratio 60/160. 60 and 160 may be the initialization values.

The final complexity of the first dependent frame is determined as a maximum of two values. One value is calculated using equation 6 or 7, and another value is determined from the method 300, such as in steps 303, 304 or 305. Then, the maximum of these values is used as the complexity of the first dependent frame. The final complexity of a P frame is $C_{field\_P} = \text{Max}(C'_{field\_P}, C^*_{field\_P})$ if the P frame is in field coding mode, or $C_{frame\_P} = \text{Max}(C'_{frame\_P}, C^*_{frame\_P})$ if the P is in frame coding mode. For example, for a P frame in field coding mode, the complexity of the first dependent frame is determined as a maximum of a value calculated from equation 6 and a value calculated at step 303 in the method 300.

Once the field or frame complexities are determined, these complexities are used to determine the bit rate for encoding the frames, such as described in U.S. patent application Ser. No. 11/539,786, incorporated by reference above. These determined complexities are estimations and are replaced by the measured actual complexities after encoding. These actual complexities may then be used to determine complexities of subsequent frames.

Figure 4:
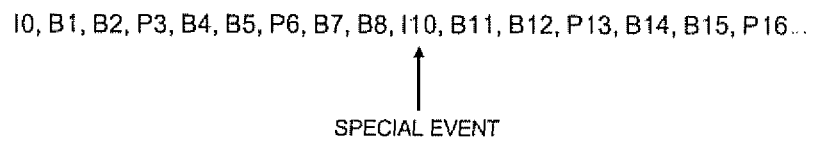
FIG. 4 illustrates an example of estimating complexity for a group of pictures in a video stream, according to an embodiment.

FIG. 4 illustrates an example of frames in a video stream in display order. I0 is a key frame and subsequent P and B frames are dependent frames. Assume a special event occurs in frame I10. Before encoding I10, the complexity of I10 is estimated from its intra activity and the activity and the actual complexity of the previous coded frame I0. For example, step 204 or step 205 in the method 200 is used to determine the complexity of I10.

The complexity of frame P13 is estimated from frame P3 based on its MeCost, such as described with respect to steps 303-306 in the method 300, or based on a given ratio of the complexity of frame I10, such as described above.

The complexity of frames B11 and B12 can also be estimated from B1 and B2 respectively. Note that the dependent frames in the same sequence prior to the special event are used to estimate complexity of frames B11 and B12, and the same applies for frame P13. For example, since B11 is the first dependent frame after the special event, the frame B1 (i.e., the first dependent frame after the frame I0) is used to estimate the complexity of B11.

After encoding the first I, P and B frames after the special event, the real complexity of I10, B11, B12 and P13 can be obtained. Therefore, the complexity of the following P and B pictures do not have to be estimated from the previous group of pictures (GOP) prior to the special event.

One or more of the steps of the methods described above and other steps described herein and software described herein may be implemented as software embedded or stored on a computer readable medium. The steps may be embodied by a computer program, which may exist in a variety of forms both active and inactive. For example, they may exist as software program(s) comprised of program instructions in source code, object code, executable code or other formats for performing some of the steps when executed. Modules include software, such as programs, subroutines, objects, etc. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of estimating complexity of a dependent frame in video, the method comprising:
in response to detecting a special event in a video stream, determining a first dependent frame after the special event using a video encoding module coupled to a processor;
determining a type of coding for the first dependent frame using the video encoding module coupled to the processor; and
estimating a complexity of the first dependent frame based on a motion estimation cost of the first dependent frame and the motion estimation cost and complexity of a single previously encoded dependent frame prior to the special event, wherein a sequence relative to an intra-frame of the single previously encoded dependent frame corresponds to a sequence relative to an intra-frame of the first dependent frame.

2. The method of claim 1, wherein the first dependent frame field coded or at least one macroblock in the first dependent frame is field coded and at least one macroblock in the first dependent frame is frame coded.

3. The method of claim 2, wherein estimating the complexity of the first dependent frame comprises:
estimating the complexity of the first dependent frame by scaling the complexity of the previously encoded dependent frame by $$\frac{MeCost}{MeCost_{prev}}$$

where MeCost is the motion estimation cost of the first dependent frame and $MeCost_{prev}$ is the motion estimation cost of the previously encoded dependent frame.

4. The method of claim 1, wherein if macroblocks in the first dependent frame are field coded and frame coded, estimating the complexity of the first dependent frame based on MeCost and $C_{prev}$, where MeCost is a summation of minimum field-based motion estimation cost and frame-based motion estimation cost for the first dependent frame and $C_{prev}$ is a complexity of the previously encoded dependent frame.

5. The method of claim 4, wherein estimating the complexity of the first dependent frame comprises:
scaling $C_{prev}$ by $$\frac{MeCost}{MeCost_{prev}}$$

where $MeCost_{prev}$ is the motion estimation cost of the previously encoded dependent frame.

6. The method of claim 1, further comprising:
estimating a second complexity of the first dependent frame by multiplying a complexity of a previously encoded key frame prior to the special event by a predetermined ratio; and
determining a maximum of the complexity and the second complexity, wherein the maximum is used as a final complexity of the first dependent frame.

7. The method of claim 6, further comprising:
selecting the predetermined ratio based on the type of coding of the first dependent frame.

8. The method of claim 1, wherein the first dependent frame comprises a P frame or a B frame in an MPEG group of pictures.

9. The method of claim 1, further comprising:
encoding the first dependent frame based on the estimated complexity.

10. A video encoder comprising software embedded on a non-transitory computer readable medium, the software comprising instructions that, when executed by a processor coupled to the non-transitory computer readable medium, perform a method comprising:
detecting a special event in a video stream;
in response to detecting the special event, identifying a first key frame of the special event, the first key frame comprising a frame during the special event coded without reference to another frame;
estimating a complexity of the first key frame based on its intra activity and a complexity of a previously encoded key frame in the video stream prior to the special event;
determining a first dependent frame after the special event;
determining a type of coding for the first dependent frame; and
estimating a complexity of the first dependent frame based on a motion estimation cost between the first dependent frame and the motion estimation cost and complexity of a single previously encoded dependent frame of a same picture type that is right after a previous I frame prior to the special event and based on the type of coding of the first dependent frame.

11. The video encoder of claim 10, wherein the method further comprises:
estimating a second complexity of the first dependent frame by multiplying a complexity of a previously encoded key frame prior to the special event by a predetermined ratio; and
determining a maximum of the complexity and the second complexity, wherein the maximum is used as a final complexity of the first dependent frame.

12. The video encoder of claim 11, wherein the method comprises:
encoding the first key frame based on the estimated complexity of the first key frame; and
encoding the first dependent frame based on the estimated complexity of the first dependent frame.

* * * * *